(12) United States Patent
Nakaoka

(10) Patent No.: US 7,720,453 B2
(45) Date of Patent: May 18, 2010

(54) SEMICONDUCTOR DEVICE

(75) Inventor: Kunio Nakaoka, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 1269 days.

(21) Appl. No.: 11/214,817

(22) Filed: Aug. 31, 2005

(65) Prior Publication Data
US 2006/0214771 A1 Sep. 28, 2006

(30) Foreign Application Priority Data
Mar. 23, 2005 (JP) ............................ 2005-084007

(51) Int. Cl.
H04B 1/06 (2006.01)
H04B 7/00 (2006.01)

(52) U.S. Cl. ................. 455/252.1; 455/550.1; 455/130; 455/182.1; 455/227

(58) Field of Classification Search ................. 455/551, 455/550.1, 9, 39, 515, 73, 556.1, 91, 130, 455/554.2, 90.3, 139, 182.1, 227, 252.1
See application file for complete search history.

(56) References Cited

U.S. PATENT DOCUMENTS 6,985,811 B2 * 1/2006 Gronemeyer ............... 701/213

2005/0138582 A1 * 6/2005 So et al. ...................... 716/4

FOREIGN PATENT DOCUMENTS

| JP | 51-102566 | 9/1976 |
|---|---|---|
| JP | 4-025046 | 1/1992 |
| JP | 10-256478 | 9/1998 |
| JP | 2001-060130 | 3/2001 |
| JP | 2001-077311 | 3/2001 |
| JP | 2001-223774 | 8/2001 |
| JP | 2001-326328 | 11/2001 |
| JP | 2002-158576 | 5/2002 |
| JP | 2003-045975 | 2/2003 |
| JP | 2003-101024 | 4/2003 |
| JP | 2003-188261 | 7/2003 |
| JP | 2004-039664 | 2/2004 |

* cited by examiner

*Primary Examiner*—Tuan A Pham
(74) *Attorney, Agent, or Firm*—Buchanan Ingersoll & Rooney PC

(57) ABSTRACT

A function processing unit includes a control-signal input/output unit to which a control signal indicating that radio data for a semiconductor device is transmitted is input by a cable signal, and a reset-signal input unit to which a reset signal instructing reset of the function processing unit is input by a cable signal, and when the reset signal is input, performs a reset process according to the reset signal. A radio-communication processing unit includes a radio-communication-processing-reset-signal input unit to which a radio communication processing reset signal instructing reset of the radio-communication processing unit is input by a cable signal, when the radio communication processing reset signal is input, performs a reset process according to the radio communication processing reset signal, and receives the radio data only when the control signal is input.

8 Claims, 7 Drawing Sheets

SEMICONDUCTOR DEVICE

BACKGROUND OF THE INVENTION

1) Field of the Invention

The present invention relates to a semiconductor device such as an integrated circuit (IC) or a large scale integration (LSI), and more particularly, to a semiconductor device including an antenna and a radio transmission/reception function built in a semiconductor element or the semiconductor device to exchange information between semiconductor devices by radio communication, with reduced connection lead wire.

2) Description of the Related Art

Conventionally, in semiconductor devices having the radio function, transfer of signals and information is all performed by radio communication. For example, a semiconductor device in which an antenna and a radio transmission/reception function circuit are mounted on a semiconductor element to perform communication or information transfer by radio wave between the semiconductor element and another semiconductor element, is proposed (see, for example, Japanese Patent Application Laid-Open No. 2001-60130).

In the conventional semiconductor device having the radio function, however, transfer of signals and information other than power supply is all performed by radio communication without using lead terminals. Accordingly, when the function of the semiconductor device and the radio communication function are lost due to malfunction by noise or the like, since the radio is the only transfer method of signals and information, there is no other function recovering method than turning off the power supply and restarting the device.

The power is normally supplied from a printed circuit board collectively to all semiconductor devices. Therefore, in a system in which a plurality of semiconductor devices having such a radio function are used, the only method of recovering the function is to reset the whole system by turning off the power supply. Furthermore, even in normal operation, all semiconductor devices receive a signal or information, which is required only for a particular semiconductor device, due to the radio communication, and hence it is necessary to determine whether the signal or the information is required. As a result, operation with low power consumption is not possible.

SUMMARY OF THE INVENTION

It is an object of the present invention to at least solve the problems in the conventional technology.

A semiconductor device according to one aspect of the present invention includes a radio-communication processing unit that is formed with a semiconductor chip or a multichip module having a radio communication function and an individual identification function, and performs various kinds of processes relating to radio communication; and a function processing unit that processes various functions based on data from the radio-communication processing unit. The function processing unit includes a control-signal input/output unit to which a control signal indicating that radio data for the semiconductor device is transmitted is input by a cable signal, and a reset-signal input unit to which a reset signal instructing reset of the function processing unit is input by a cable signal, and when the reset signal is input, performs a reset process according to the reset signal. The radio-communication processing unit includes a radio-communication-processing-reset-signal input unit to which a radio communication processing reset signal instructing reset of the radio-communication processing unit is input by a cable signal, when the radio communication processing reset signal is input, performs a reset process according to the radio communication processing reset signal, and receives the radio data only when the control signal is input.

A semiconductor device according to another aspect of the present invention includes a radio-communication processing unit that is formed with a semiconductor chip or a multichip module having a radio communication function and an individual identification function, and performs various kinds of processes relating to radio communication; and a function processing unit that processes various functions based on data from the radio-communication processing unit. The function processing unit includes a control-signal input unit to which a first control signal indicating that radio data for the semiconductor device is transmitted from other semiconductor device connected with the semiconductor device via a daisy chain or from an external apparatus is input by a cable signal, and a control-signal output unit that outputs a second control signal indicating that radio data for the other semiconductor device is transmitted, when a data transmission or a data request is performed with respect to the other semiconductor device, by a cable signal, a reset-signal input unit to which a first reset signal instructing reset of the function processing unit is input by a cable signal from the other semiconductor device or the external apparatus, and a reset-signal output unit that outputs a second reset signal instructing reset of a function processing unit of the other semiconductor device by a cable signal, when the first reset signal is input, performs a reset process according to the first reset signal, and when there is no response to the second control signal output from the other semiconductor device, outputs the second reset signal to the other semiconductor device. The radio-communication processing unit includes a radio-communication-processing-reset-signal input unit to which a radio communication processing reset signal instructing reset of the radio-communication processing unit is input by a cable signal, when the radio communication processing reset signal is input, performs a reset process according to the radio communication processing reset signal, and receives the radio data only when the first control signal is input.

The other objects, features, and advantages of the present invention are specifically set forth in or will become apparent from the following detailed description of the invention when read in conjunction with the accompanying drawings.

DETAILED DESCRIPTION

Exemplary embodiments of a semiconductor device according to the present invention will be explained in detail below with reference to the accompanying drawings. The present invention is not limited by the present embodiments, and various modifications can be made without departing from the spirits of the invention.

In a first embodiment of the present invention, a semiconductor device formed by using a semiconductor chip or a multi-chip module having a radio communication function and an individual identification function, and including a radio-communication processing unit that performs various kinds of processes relating to radio communication, and a function processing unit that executes various functions based on data from the radio-communication processing unit will be explained. In the semiconductor device, the function processing unit includes a control-signal input/output unit to which a control signal indicating that radio data for the own device is transmitted is input by a cable signal, and a reset-signal input unit to which a reset signal instructing reset of the own unit is input by a cable signal, and resets the own unit according to the reset signal, when the reset signal is input to the reset-signal input unit. The radio-communication processing unit has a radio-communication-processing-reset-signal input unit to which a radio communication processing reset signal instructing reset of the own unit is input by a cable signal, and when the radio communication processing reset signal is input to the radio-communication-processing-reset-signal input unit, resets the own unit according to the radio communication processing reset signal, and receives radio data only when a control signal indicating that the radio data for the own device is transmitted is input to the function processing unit.

Figure 1:
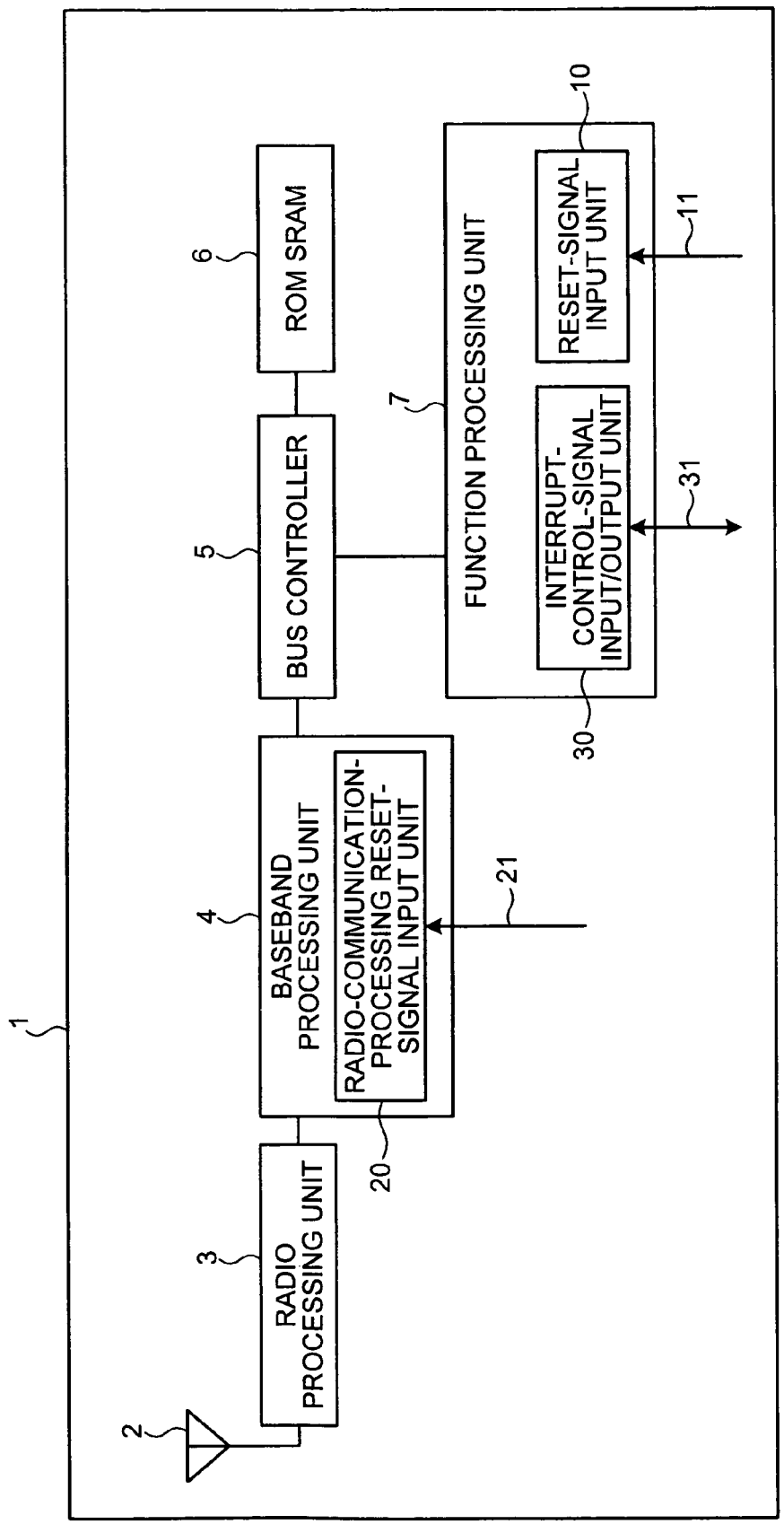
FIG. 1 is a schematic diagram of a semiconductor device according to a first embodiment of the present invention.

FIG. 1 is a schematic diagram of the semiconductor device according to the first embodiment. As shown in FIG. 1, the semiconductor device according to the first embodiment includes a function unit 1 having a radio communication function and an individual identification function, formed on a semiconductor chip or by using a plurality of semiconductor chips or a multi-chip module. The function unit 1 has an antenna 2, a radio processor 3, and a baseband processor 4, as a radio-communication processing unit that performs various kinds of processes relating to radio communication. The function unit 1 also has a broadcast unknown server (BUS) controller 5, a read only memory-static random access memory (ROM-SRAM) 6, and a function processing unit 7 that processes various functions based on data from the radio-communication processing unit.

The antenna 2 performs transmission/reception of radio data. The radio processor 3 performs processing relating to radio communication. The baseband processor 4 modulates various data for radio communication. The BUS controller 5 manages and controls various data. The ROM-SRAM 6 is a storage unit that stores various data. The function processing unit 7 realizes various functions.

The function processing unit 7 has a reset-signal input unit 10 to which a reset signal instructing reset of the own function processing unit 7 is input by a cable signal, and an interrupt control-signal input/output unit 30, to and from which an interrupt control signal indicating that radio data for the own device is transmitted is input and output by a cable signal. When a reset signal is input to the reset-signal input unit 10, the function processing unit 7 resets itself according to the reset signal.

The baseband processor 4 has a radio-communication-processing-reset-signal input unit 20 to which a radio communication processing reset signal instructing reset of the radio-communication processing unit is input by a cable signal. When a radio communication processing reset signal is input to the radio-communication-processing-reset-signal input unit 20, the antenna 2, the radio processor 3, and the baseband processor 4, which constitute the radio-communication processing unit, reset themselves according to the radio communication processing reset signal. The antenna 2 receives the radio data only when the interrupt control signal indicating that the radio data for the own device is transmitted is input to the function processing unit 7.

The basic operation of the semiconductor device will be explained. The semiconductor device transmits/receives the radio data by the antenna 2, and the received radio data is subjected to predetermined processing relating to the radio communication such as demodulation in the radio processor 3 and the baseband processor 4, and transmitted to the BUS controller 5. The data transmitted to the BUS controller 5 is stored in the ROM-SRAM 6, or control is performed, such as being transmitted to the function processing unit 7. When the data is transmitted to the function processing unit 7, the function processing unit 7 executes various functions based on the data.

The characteristic point of the semiconductor device according to the first embodiment will be explained. In the semiconductor device according to the first embodiment constituted in the above manner, since the interrupt control signal is input to the interrupt control-signal input/output unit 30 provided in the function processing unit 7, it is known beforehand that radio data is transmitted to the function unit 1 in the own device, without actually receiving the radio data and demodulating the data.

Accordingly, since the radio data for the own device is not transmitted when the interrupt control signal is not input to the interrupt control-signal input/output unit 30 in the function processing unit 7, the operation for receiving and demodulating the transmitted radio data is not necessary. In other words, in this semiconductor device, it is not necessary to receive and demodulate all signals and information, including signals and information only required for a particular semiconductor device, and determine whether the signal or information is required for the own device. Accordingly, in this semiconductor device, only when the radio data for the own device is transmitted thereto, the radio data for the own device is received and subjected to the post-processing. As a result, a semiconductor device that can operate with low power consumption can be realized.

Since the interrupt control signal is a status signal, which is a cable signal, pattern wiring on a printed circuit board can be realized easily, as compared with a cable BUS signal, with less influence of noise.

Only the function processing unit 7 can be independently reset to recover the function, by providing the reset-signal input unit 10 in the function processing unit 7 so that a reset signal can be input from outside. Accordingly, even when the function processing unit 7 loses the function, it is not necessary to turn off the power supply to restart the whole function unit 1. By inputting the reset signal to the reset-signal input unit 10 in the function processing unit 7 from outside, only the function processing unit 7 can be independently reset, to recover the function thereof easily.

In a semiconductor device having the radio function, generally, the power supply for an IC, an LSI, a module, or the like on the printed circuit board is not designed so that these units can be turned on or off independently. Therefore, when it is attempted to realize transfer of information and signals with the outside by radio in such a semiconductor device, if any of the components loses its function, there is no other method of functional recovery than to turn off the power supply for the whole system.

In the semiconductor device according to the first embodiment, however, only the function processing unit 7 can be reset independently to recover the function easily, by providing the reset-signal input unit 10 in the function processing unit 7 so that a reset signal can be input from outside. Accordingly, even in a system constituted by using a plurality of semiconductor devices, only the function processing unit 7 in the respective semiconductor devices can be reset independently to recover the function easily, without turning off the power supply for the whole system.

In the semiconductor device according to the first embodiment, the radio-communication-processing-reset-signal input unit 20 is provided in the baseband processor 4, independent of the function processing unit 7. Accordingly, the radio communication function, in which a function loss is likely to occur, can be reset independently. Therefore, in the semiconductor device according to the first embodiment, only the radio communication function can be reset independently to recover the function easily, without resetting also the function processing unit 7. Even in a system constituted by using a plurality of semiconductor devices, only the radio communication function can be reset independently to recover the function easily, without turning off the power supply for the whole system.

According to a second embodiment of the present invention, a semiconductor device including a monitoring unit will be explained, in which the function processing unit monitors the operation state of the radio-communication processing unit, and when the function of the radio-communication processing unit is lost, the monitoring unit generates a radio communication processing reset signal instructing reset of the radio-communication processing unit and transmits the reset signal to the radio-communication processing unit.

Figure 2:
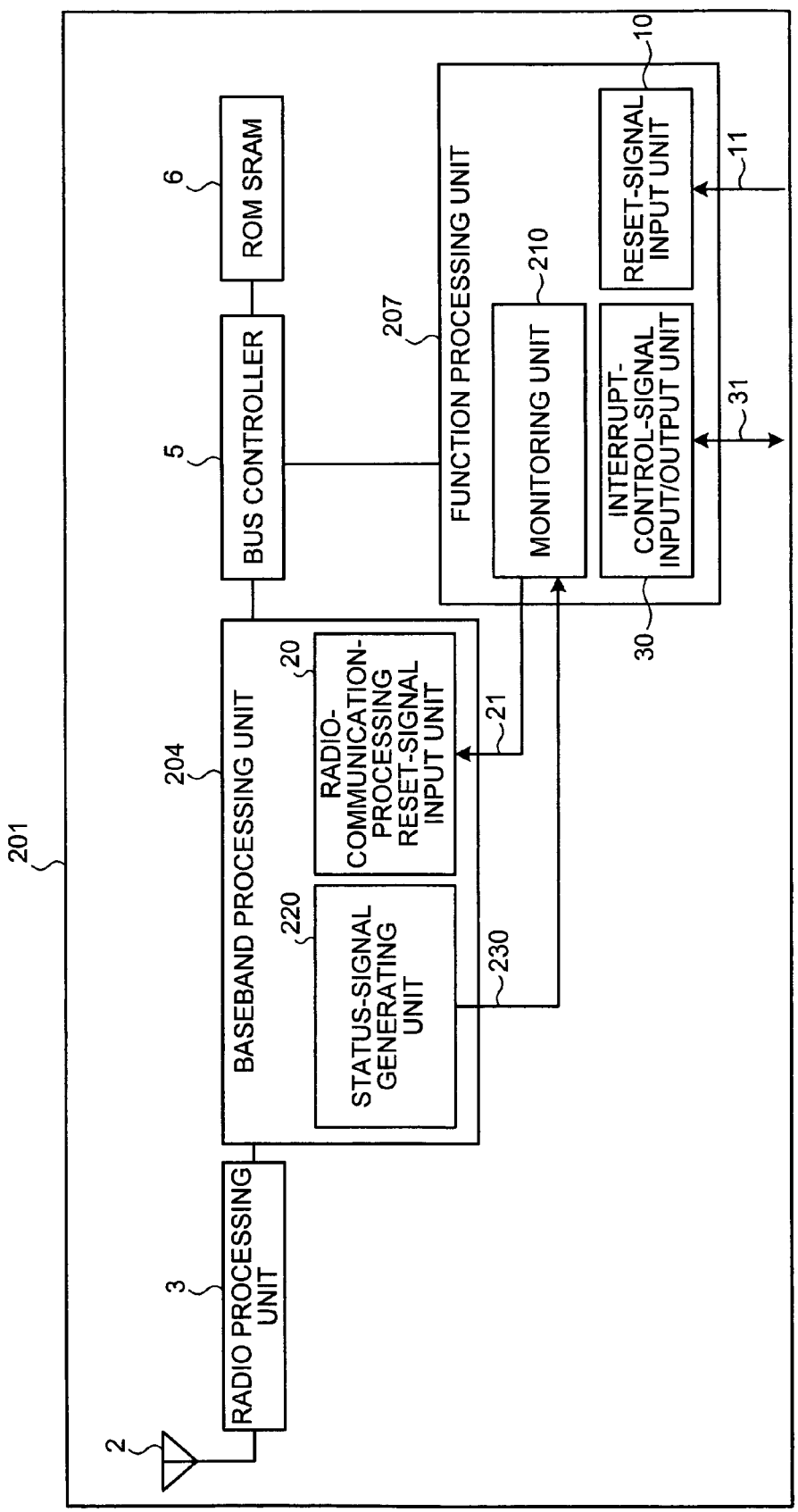
FIG. 2 is a schematic diagram of a semiconductor device according to a second embodiment of the present invention.

FIG. 2 is a schematic diagram of the semiconductor device according to the second embodiment. As shown in FIG. 2, similarly to the first embodiment, the semiconductor device according to the second embodiment has a function unit 201 having the radio communication function and the individual identification function formed on the semiconductor chip or by using a plurality of the semiconductor chips or the multi-chip module. The function unit 201 includes the antenna 2, the radio processor 3, the baseband processor 4, the BUS controller 5, the ROM-SRAM 6, and a function processing unit 207.

The function processing unit 207 has the reset-signal input unit 10, the interrupt control-signal input/output unit 30, and a monitoring unit 210. The baseband processor 204 has the radio-communication-processing-reset-signal input unit 20 and a status signal generating unit 220. Like reference signs designate like parts in the first embodiment and detailed explanation thereof is omitted.

The difference between the semiconductor device according to the second embodiment and the semiconductor device according to the first embodiment is that the function processing unit 207 includes the monitoring unit 210, and that the baseband processor 204 includes the status signal generating unit 220.

The monitoring unit 210 monitors the operation state of the radio-communication processing unit, and when the function of the radio-communication processing unit is lost, generates a radio communication processing reset signal 21 instructing reset of the radio-communication processing unit and transmits the reset signal 21 to the radio-communication processing unit. The status signal generating unit 220 generates a radio unit status signal 230, which is the operation status information of the baseband processor 204, and transmits the signal 230 to the monitoring unit 210.

In the semiconductor device having such a configuration, when the function processing unit 207 receives an interrupt request by an interrupt control signal 31, the monitoring unit 210 confirms the radio unit status signal 230 transmitted from the baseband processor 204, to determine whether the radio communication function is available. As a result of determination, when the radio communication function is lost, the monitoring unit 210 generates the radio communication processing reset signal 21 and transmits the signal 21 to the baseband processor 204. In the baseband processor 204, the radio-communication-processing-reset-signal input unit 20 resets the radio communication function based on the radio communication processing reset signal 21.

In the semiconductor device according to the second embodiment, since the monitoring unit 210 is provided, the radio communication processing reset signal 21 can be generated in the semiconductor device, and transmitted to the radio-communication processing unit, thereby enabling reduction of the external terminals of the function unit 201 by one.

Since the baseband processor 204 handles the radio data coming from outside, there is a high possibility of losing the function due to unexpected noise, as compared with the function processing unit 207. The possibility of losing the function of the baseband processor 204 can be reduced, by the functional recovery configuration in which the radio communication processing reset signal 21 is generated in the function unit 201, thereby reducing the data input to the baseband processor 204 from outside. Further, when a plurality of function units is combined to form a system, the control of the system can be simplified.

According to a third embodiment of the present invention, a semiconductor device including a radio-communication processing unit that suspends the radio communication function, when a control signal indicating that the radio data for the own device is transmitted is not input to the control-signal input/output unit, and particularly, a semiconductor device in which the radio-communication processing unit includes a radio-communication-function-suspension control unit that controls suspension of the radio communication function when a radio communication function suspension signal instructing suspension of the radio communication function is input by a cable signal, based on the radio communication function suspension signal will be explained.

Figure 3:
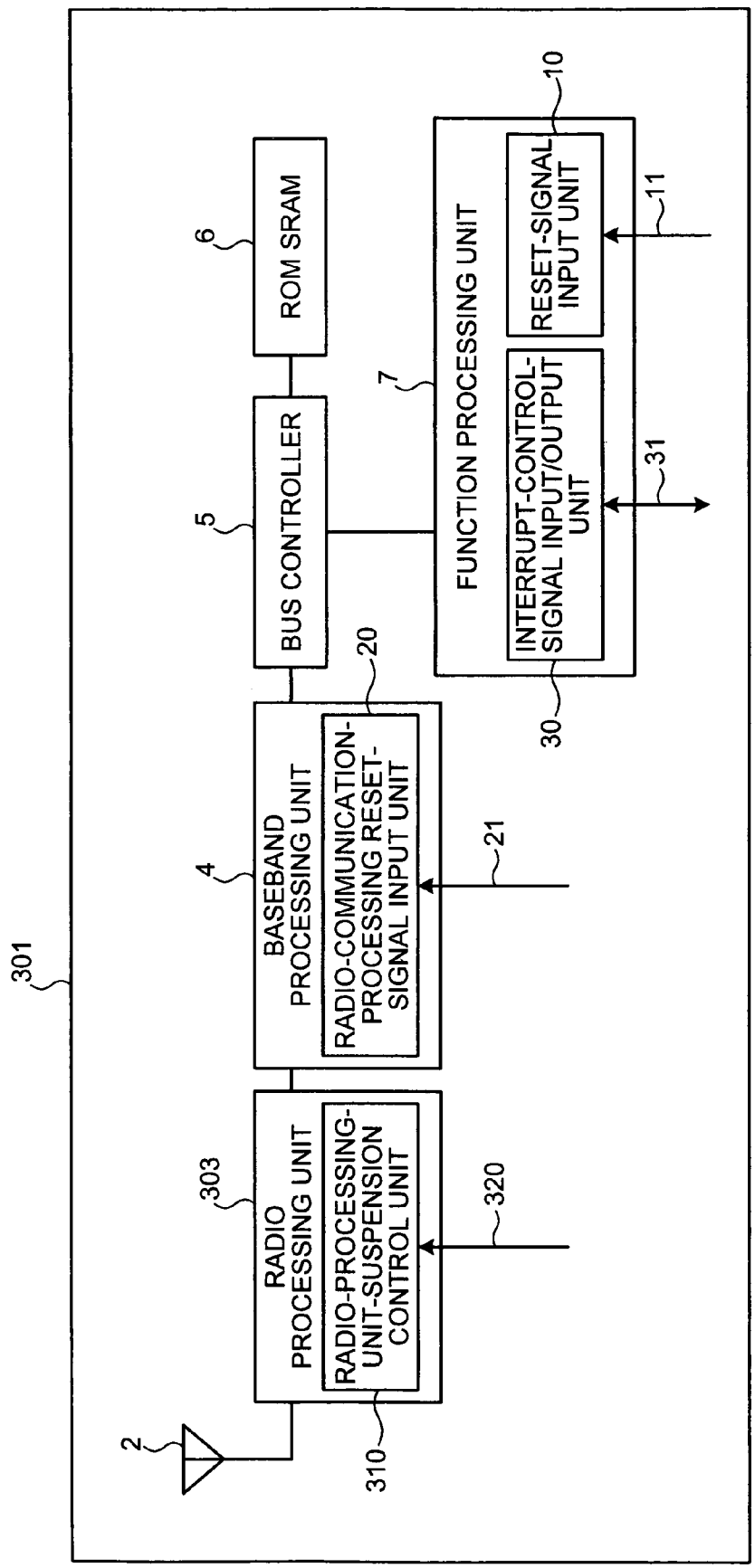
FIG. 3 is a schematic diagram of a semiconductor device according to a third embodiment of the present invention.

FIG. 3 is a schematic diagram of the semiconductor device according to the third embodiment. As shown in FIG. 3, the semiconductor device according to the third embodiment has a function unit 301 having the radio communication function and the individual identification function formed on the semiconductor chip or by using a plurality of the semiconductor chips or the multi-chip module, similarly to the first embodiment. The function unit 301 includes the antenna 2, a radio processor 303, the baseband processor 4, the BUS controller 5, the ROM-SRAM 6, and the function processing unit 7.

The function processing unit 7 includes the reset-signal input unit 10 and the interrupt control-signal input/output unit 30. The baseband processor 4 has the radio-communication-processing-reset-signal input unit 20. The radio processor 303 has a radio processor suspension controller 310. When the interrupt control signal 31 indicating that the radio data for the own device is transmitted is not input to the interrupt control-signal input/output unit 30, the radio processor suspension controller 310 controls suspension of the function of the radio processor 303 based on a radio processor enable signal 320, which is a radio communication function suspension signal instructing suspension of the radio communication function of the radio processor 303, when the radio processor enable signal 320 is input by a cable signal. Like reference signs designate like parts in the above embodiments and detailed explanation thereof is omitted.

The difference between the semiconductor device according to the third embodiment and the semiconductor device according to the first embodiment is that the radio processor 303 includes the radio processor suspension controller 310. In a radio network such as a radio local area network (LAN), a signal referred to as a beacon or the like is regularly transmitted to identify an individual function unit. In the present invention, however, since the function unit 301 is selected by the interrupt control signal 31 input by a cable, data can be transferred according to the interrupt control signal 31, and hence, the individual identification information such as the beacon is not necessary. Therefore, when the interrupt control signal 31 is not input, the radio function is suspended according to the radio processor enable signal 320. As a result, unnecessary operation can be reduced, thereby realizing a semiconductor device that can operate with low power consumption.

According to the third embodiment, the radio processor 3 in the configuration of the semiconductor device according to the first embodiment is changed to the radio processor 303, but the radio processor 3 in the semiconductor device according to the second embodiment may be changed to the radio processor 303.

According to a fourth embodiment of the present invention, a semiconductor device including a function processing unit having a radio-communication-function control unit that generates a radio communication function suspension signal, when the control signal indicating that the radio data for the own device is transmitted is not input to the control-signal input/output unit, and transmits the signal to the radio-communication processing unit will be explained.

Figure 4:
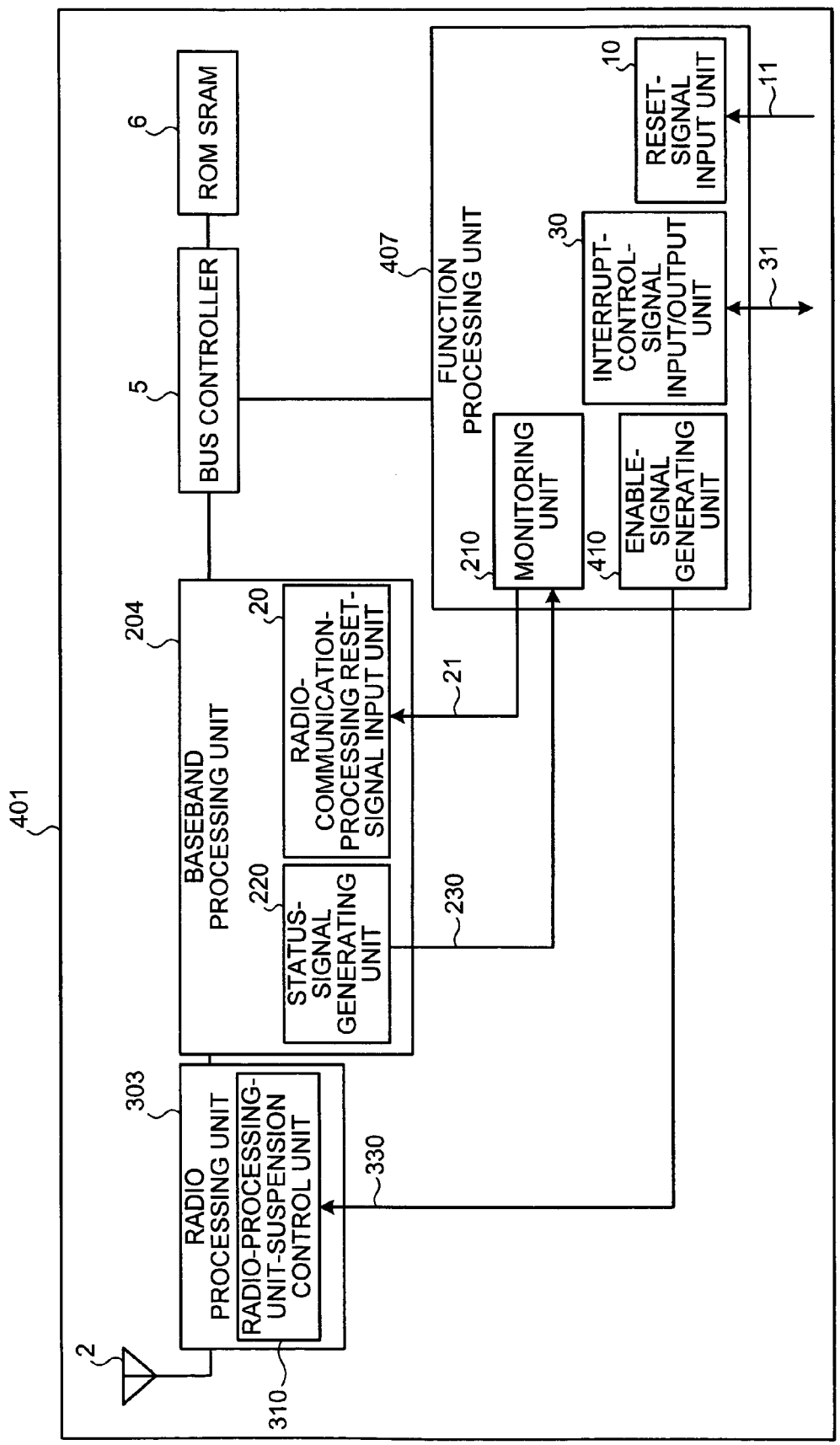
FIG. 4 is a schematic diagram of a semiconductor device according to a fourth embodiment of the present invention.

FIG. 4 is a schematic diagram of the semiconductor device according to the fourth embodiment. As shown in FIG. 4, similarly to the second embodiment, the semiconductor device in the fourth embodiment has a function unit 401 having the radio communication function and the individual identification function formed on the semiconductor chip or by using a plurality of the semiconductor chips or the multi-chip module. The function unit 401 includes the antenna 2, the radio processor 3, the baseband processor 204, the BUS controller 5, the ROM-SRAM 6, and a function processing unit 407.

The function processing unit 407 has the reset-signal input unit 10, the interrupt control-signal input/output unit 30, the monitoring unit 210, and an enable signal generating unit 410. The baseband processor 204 has the radio-communication-processing-reset-signal input unit 20 and the status signal generating unit 220. The radio processor 303 has the radio processor suspension controller 310.

When the interrupt control signal 31 indicating that the radio data for the own device is transmitted is not input to the interrupt control-signal input/output unit 30, the enable signal generating unit 410 generates a radio processor enable signal 330, which is a radio communication function suspension signal instructing suspension of the radio communication function of the radio processor 303, and outputs the signal to the radio processor suspension controller 310 by a cable signal. When the radio processor enable signal 330 is input to the radio processor suspension controller 310, the radio processor 303 controls suspension of function of the radio processor 303 according to the radio processor enable signal 330. Like reference signs designate like parts in the above embodiments and detailed explanation thereof is omitted.

In the semiconductor device according to the fourth embodiment, since the enable signal generating unit 410 is provided, the radio processor enable signal 330, which is a radio communication function suspension signal instructing suspension of the radio communication function of the radio processor 303, can be generated inside the semiconductor device and transmitted to the radio processor 303, thereby enabling reduction of external terminals of the function unit 401 and simplifying the function unit 401. Further, unnecessary operation by the radio processor 303 can be reduced, thereby realizing a semiconductor device that can operate with low power consumption. Since the enable function of the radio processor 303 is provided inside the function unit 401, when a system is constructed by combining a plurality of function units, control of the system can be simplified.

According to a fifth embodiment of the present invention, a semiconductor device in which the interrupt control-signal input/output unit 30 in the semiconductor device according to the fourth embodiment, which is for both input and output, is separated to an interrupt control-signal input unit and an interrupt control-signal output unit, and a reset-signal output unit is added therein, will be explained.

Figure 5:
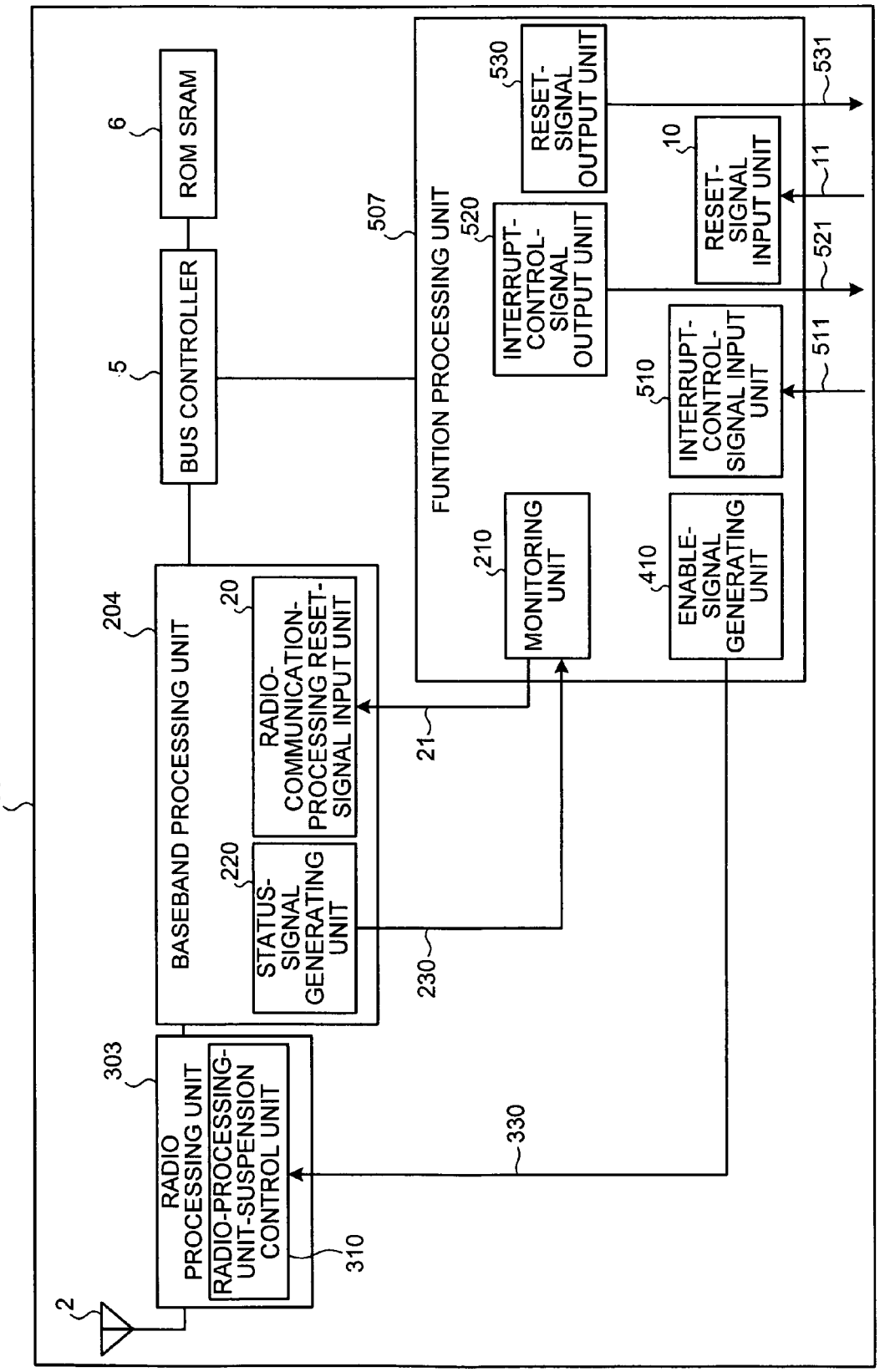
FIG. 5 is a schematic diagram of a semiconductor device according to a fifth embodiment of the present invention.

FIG. 5 is a schematic diagram of the semiconductor device according to the fifth embodiment. As shown in FIG. 5, similarly to the fourth embodiment, the semiconductor device in the fifth embodiment has a function unit 501 having the radio communication function and the individual identification function formed on the semiconductor chip or by using a plurality of the semiconductor chips or the multi-chip module. The function unit 501 includes the antenna 2, the radio processor 303, the baseband processor 204, the BUS controller 5, the ROM-SRAM 6, and a function processing unit 507.

The function processing unit 507 includes the monitoring unit 210, the enable signal generating unit 410, the reset-signal input unit 10, a reset-signal output unit 530, an interrupt control-signal input unit 510, and an interrupt control-signal output unit 520. The baseband processor 204 has the radio-communication-processing-reset-signal input unit 20 and the status signal generating unit 220. The radio processor 303 has the radio processor suspension controller 310.

An interrupt control signal 511 indicating that radio data for the own device is transmitted from another semiconductor device connected to the own device via a daisy chain or an external apparatus is input by a cable signal to the interrupt control-signal input unit 510. The interrupt control-signal output unit 520 outputs an interrupt control signal 521 indicating that radio data for another semiconductor device connected to the own device via the daisy chain is transmitted by a cable signal, when data transmission or a data request is made with respect to the other semiconductor device.

A reset signal 11 instructing reset of the own function processing unit 507 is input by a cable signal to the reset-signal input unit 10 from another semiconductor device connected to the own device via the daisy chain or an external apparatus. The reset-signal output unit 530 outputs a reset signal 531 instructing reset to the function processing unit in another semiconductor device connected to the own device via the daisy chain by a cable signal. When the reset signal 11 is input to the reset-signal input unit 10, the function processing unit 507 resets the own unit according to the reset signal, and when there is no response to the interrupt control signal 521 output from the interrupt control-signal output unit 520, the reset-signal output unit 530 outputs the reset signal 531 instructing reset to the function processing unit in the other semiconductor device.

The baseband processor 204 has the radio-communication-processing-reset-signal input unit 20 and the status signal generating unit 220. The radio processor 303 has the radio processor suspension controller 310. Like reference signs designate like parts in the above embodiments, and detailed explanation thereof is omitted. The basic operation is the same as that in the fourth embodiment.

The interrupt control and the reset control in the first and the fourth embodiments are suitable when controlling the function unit 1 (401) by centralized control using a central processing unit (CPU) or the like, whereas the semiconductor device in the fifth embodiment is suitable for use when the interrupt control and the reset function are realized in a system formed of a set of function units in which a main part of control such as the CPU does not exist.

In the configuration of the semiconductor device according to the fifth embodiment, the interrupt control-signal input unit 510 and the interrupt control-signal output unit 520 are connected to each other via the daisy chain and share a signal in a plurality of function units. When data transfer or a data request is made with respect to another function unit, the interrupt control-signal output unit 520 outputs the interrupt control signal 521. When there is no response to the interrupt control signal 521, the reset-signal output unit 530 also connected via the daisy chain transmits the reset signal 531, to reset the function unit in the other device. Accordingly, the function units in other semiconductor devices connected via the daisy chain can be managed and controlled mutually.

According to a sixth embodiment of the present invention, a semiconductor device including a reset-signal generating unit that generates a reset signal instructing reset of the function processing unit based on a control signal indicating that radio data for the own device is transmitted, will be explained. In the sixth embodiment, a semiconductor device further including a reset-signal generating unit 60 in the configuration of the semiconductor device according to the fourth embodiment will be explained.

Figure 6:
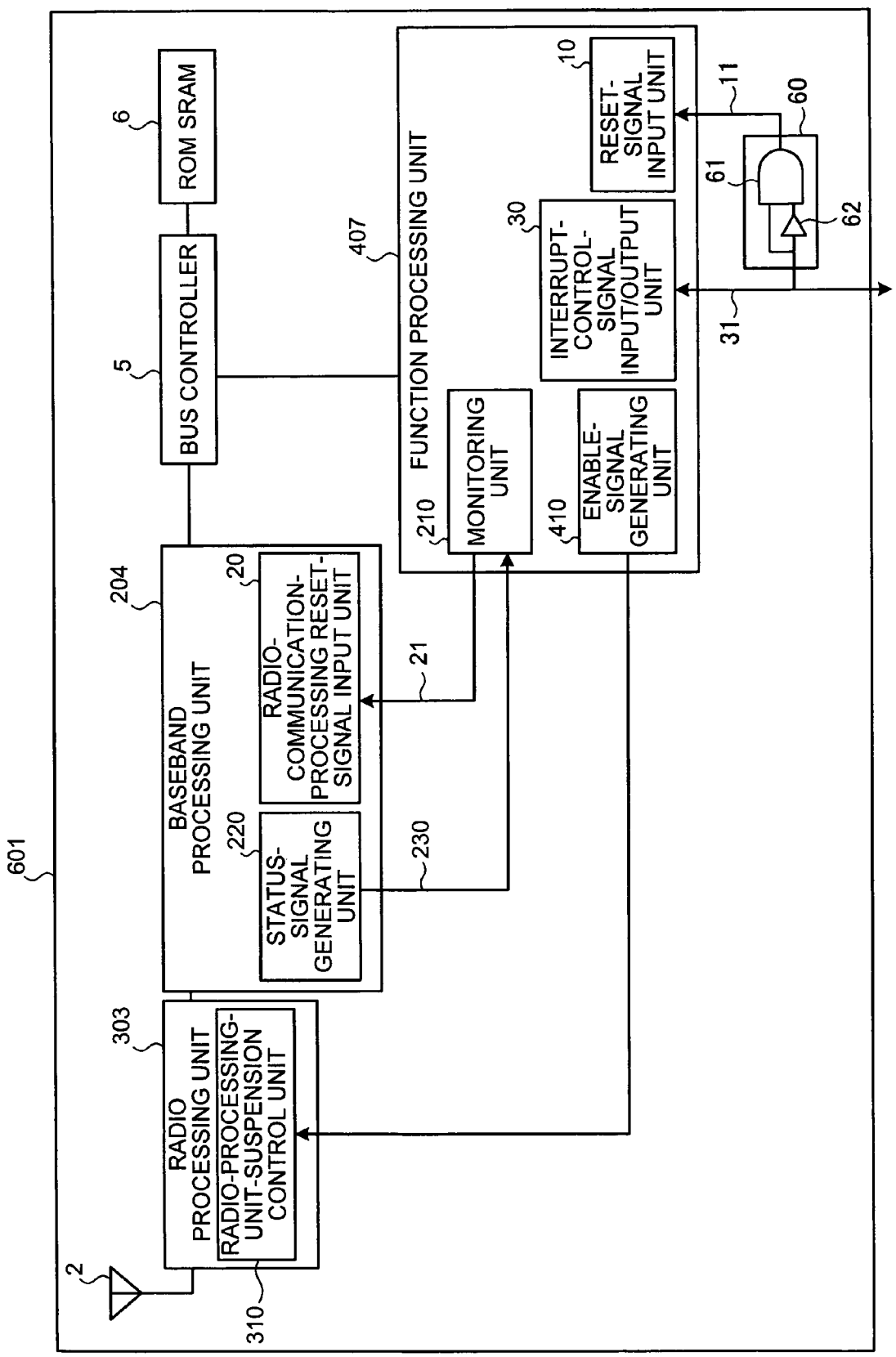
FIG. 6 is a schematic diagram of a semiconductor device according to a sixth embodiment of the present invention.

FIG. 6 is a schematic diagram of the semiconductor device according to the sixth embodiment. As shown in FIG. 6, similarly to the fourth embodiment, the semiconductor device in the sixth embodiment has a function unit 601 having the radio communication function and the individual identification function formed on the semiconductor chip or by using a plurality of the semiconductor chips or the multi-chip module. The function unit 601 includes the antenna 2, the radio processor 303, the baseband processor 204, the BUS controller 5, the ROM-SRAM 6, the function processing unit 407, and the reset-signal generating unit 60.

The function processing unit 407 has the reset-signal input unit 10, the interrupt control-signal input/output unit 30, the monitoring unit 210, and the enable signal generating unit 410. The baseband processor 204 has the radio-communication-processing-reset-signal input unit 20 and the status signal generating unit 220. The radio processor 303 has the radio processor suspension controller 310. Like reference signs designate like parts in the above embodiments, and detailed explanation thereof is omitted.

The reset-signal generating unit 60 generates a reset signal instructing reset of the function processing unit 407, based on the interrupt control signal 31 indicating that radio data for the own device is transmitted. Such a reset-signal generating unit 60 can be formed by, for example, using the fact that a pulse signal within delay time of a delay element 62 is removed in a circuit including an AND element 61 and the delay element 62. If the pulse width used in the interrupt control-signal input/output unit 30 is set within the delay time, the reset signal is not generated, and hence, normal control is possible. When requiring reset, if a pulse added with a pulse width required for the reset is input to the interrupt control signal 31 within the delay time, the reset signal 12 is generated in the reset-signal generating unit 60, and input to the reset-signal input unit 10.

In the semiconductor device according to the sixth embodiment, since the reset-signal generating unit 60 is included, the reset signal 12 instructing reset of the own function processing unit 407 can be generated inside the semiconductor device and transmitted to the function processing unit 407, thereby enabling reduction by one of reset signal inputs with respect to the function unit 601 from outside.

According to a seventh embodiment of the present invention, an example of applying a method of generating the reset signal inside the semiconductor device explained in the sixth embodiment to the semiconductor device of the daisy chain type explained in the fifth embodiment will be explained.

Figure 7:
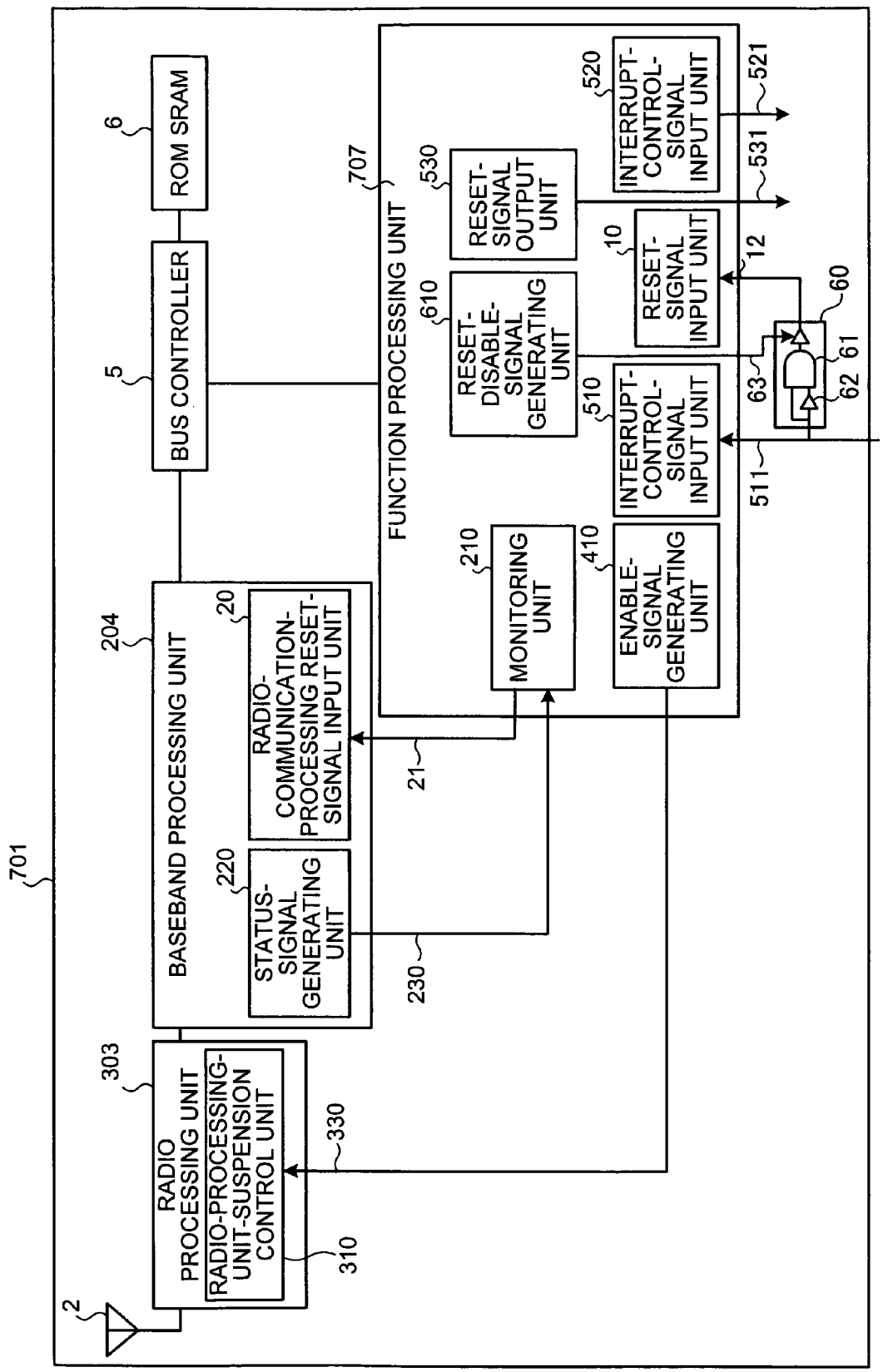
FIG. 7 is a schematic diagram of a semiconductor device according to a seventh embodiment of the present invention.

FIG. 7 is a schematic diagram of a semiconductor device according to the seventh embodiment. As shown in FIG. 7, similarly to the fifth embodiment, the semiconductor device in the seventh embodiment has a function unit 701 having the radio communication function and the individual identification function formed on the semiconductor chip or by using a plurality of the semiconductor chips or the multi-chip module. The function unit 701 includes the antenna 2, the radio processor 303, the baseband processor 204, the BUS controller 5, the ROM-SRAM 6, and a function processing unit 707.

The function processing unit 707 has the monitoring unit 210, the enable signal generating unit 410, the reset-signal input unit 10, the reset-signal output unit 530, the interrupt control-signal input unit 510, the interrupt control-signal output unit 520, and a reset disable signal generating unit 610. The baseband processor 204 has the radio-communication-processing-reset-signal input unit 20 and the status signal generating unit 220. The radio processor 303 has the radio processor suspension controller 310. Like reference signs designate like parts in the above embodiments, and detailed explanation thereof is omitted. The basic operation is the same as that in the fifth embodiment.

In the semiconductor device according to the seventh embodiment, since the interrupt control signal is shared by all function units constituting the daisy chain, in the daisy chain type connection, the reset disable signal generating unit 610 that generates a reset disable signal so that function units other than a function unit to be reset are not reset is provided, to input a signal to the reset-signal generating unit 60. As a result, only a desired function unit is reset.

The configuration is not limited to the one in the above explanation, and respective embodiments may be combined. Even in this case, the effect of the present invention explained above can be obtained.

According to the present invention, even when a part of the function of the semiconductor device or the radio communication function is lost, only the function unit having a failure can be independently recovered, without restarting the power supply for the semiconductor device. Further, when the operation is not required, the radio function is suspended, thereby obtaining a semiconductor device that can operate with low power consumption.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor device comprising:
   a radio-communication processing unit that is formed with
     a semiconductor chip or a multi-chip module having a radio communication function and an individual identification function, and performs various kinds of processes relating to radio communication; and a function processing unit that processes various functions based on data from the radio-communication processing unit, wherein the function processing unit includes a control-signal input/output unit to which a control signal indicating that the radio data for the semiconductor device is transmitted is input by a cable signal, and a reset-signal input unit to which a reset signal instructing reset of the function processing unit is externally input by a cable signal, and when the reset signal is input, performs a reset process according to the reset signal, and the radio-communication processing unit includes a radio-communication-processing-reset-signal input unit independent of the function processing unit, to which a radio communication processing reset signal instructing reset of the radio-communication processing unit is input by a cable signal, when the radio communication processing reset signal is input, performs a reset process according to the radio communication processing reset signal, and receives the radio data only when the control signal is input.

2. The semiconductor device according to claim 1, wherein the function processing unit includes a monitoring unit that monitors an operation state of the radio-communication processing unit, and when the function of the radio-communication processing unit is lost, generates the radio communication processing reset signal, and transmits the radio communication processing reset signal to the radio-communication processing unit.

3. The semiconductor device according to claim 1, wherein, when the control signal is not input, the radio-communication processing unit suspends the radio communication function.

4. The semiconductor device according to claim 3, wherein the radio-communication processing unit includes a radio-communication-function-suspension control unit that suspends, when a radio communication function suspension signal instructing suspension of the radio communication function is input by a cable signal, the radio communication function based on the radio communication function suspension signal.

5. The semiconductor device according to claim 4, wherein the function processing unit includes a radio-communication-function control unit that generates, when the control signal is not input, the radio communication function suspension signal, and transmits the radio communication function suspension signal to the radio-communication processing unit.

6. The semiconductor device according to claim 1, further including a reset-signal generating unit that generates the reset signal based on the control signal.

7. A semiconductor device comprising:

a radio-communication processing unit that is formed with a semiconductor chip or a multi-chip module having a radio communication function and an individual identification function, and performs various kinds of processes relating to radio communication; and a function processing unit that processes various functions based on data from the radio-communication processing unit, wherein the function processing unit includes a control-signal input unit to which a first control signal indicating that radio data for the semiconductor device is transmitted from other semiconductor device connected with the semiconductor device via a daisy chain or from an external apparatus input by a cable signal, and a control-signal output unit that outputs a second control signal indicating that radio data for the other semiconductor device is transmitted, when a data transmission or a data request is performed with respect to the other semiconductor device, by a cable signal, a rest-signal input unit to which a first reset signal instructing reset of the function processing unit is input by a cable signal from the other semiconductor device or the external apparatus, and a reset-signal output unit that outputs a second reset signal instructing reset of a function processing unit of the other semiconductor device by a cable signal, when the first reset signal is input, performs a reset process according to the first reset signal, and when there is no response to the second control signal output from the other semiconductor device, outputs the second reset signal to the other semiconductor device, and the radio-communication processing unit includes a radio-communication-processing-reset-signal input unit to which a radio communication processing reset signal instructing reset of the radio-communication processing unit is input by a cable signal, when the radio communication processing reset signal is input, performs a reset process according to the radio communication processing reset signal, and receives the radio data only when the first control signal is input.

8. The semiconductor device according to claim 7, wherein the function processing unit includes a monitoring unit that monitors an operation state of the radio-communication processing unit, and when the function of the radio-communication processing unit is lost, generates the radio communication processing reset signal, and transmits the radio communication processing reset signal to the radio-communication processing unit.

* * * * *